UNITED STATES PATENT OFFICE.

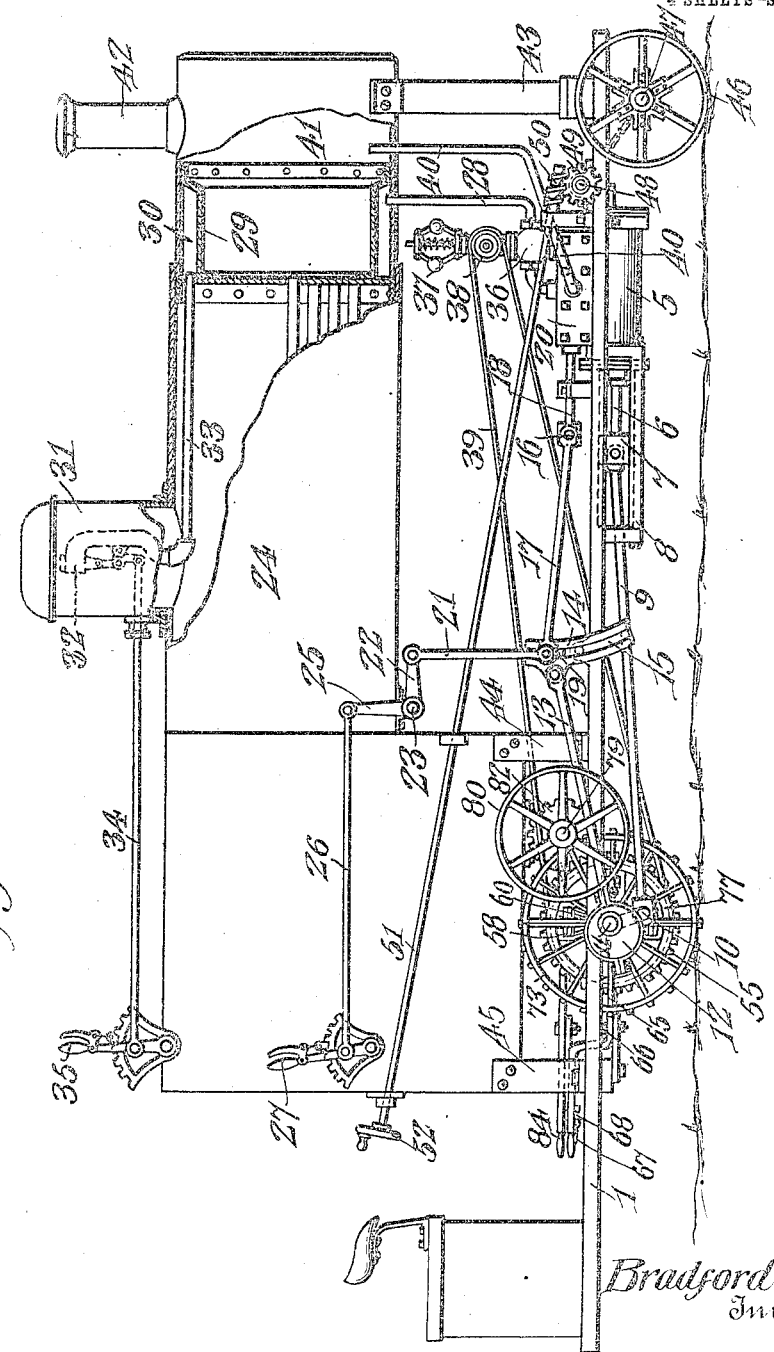

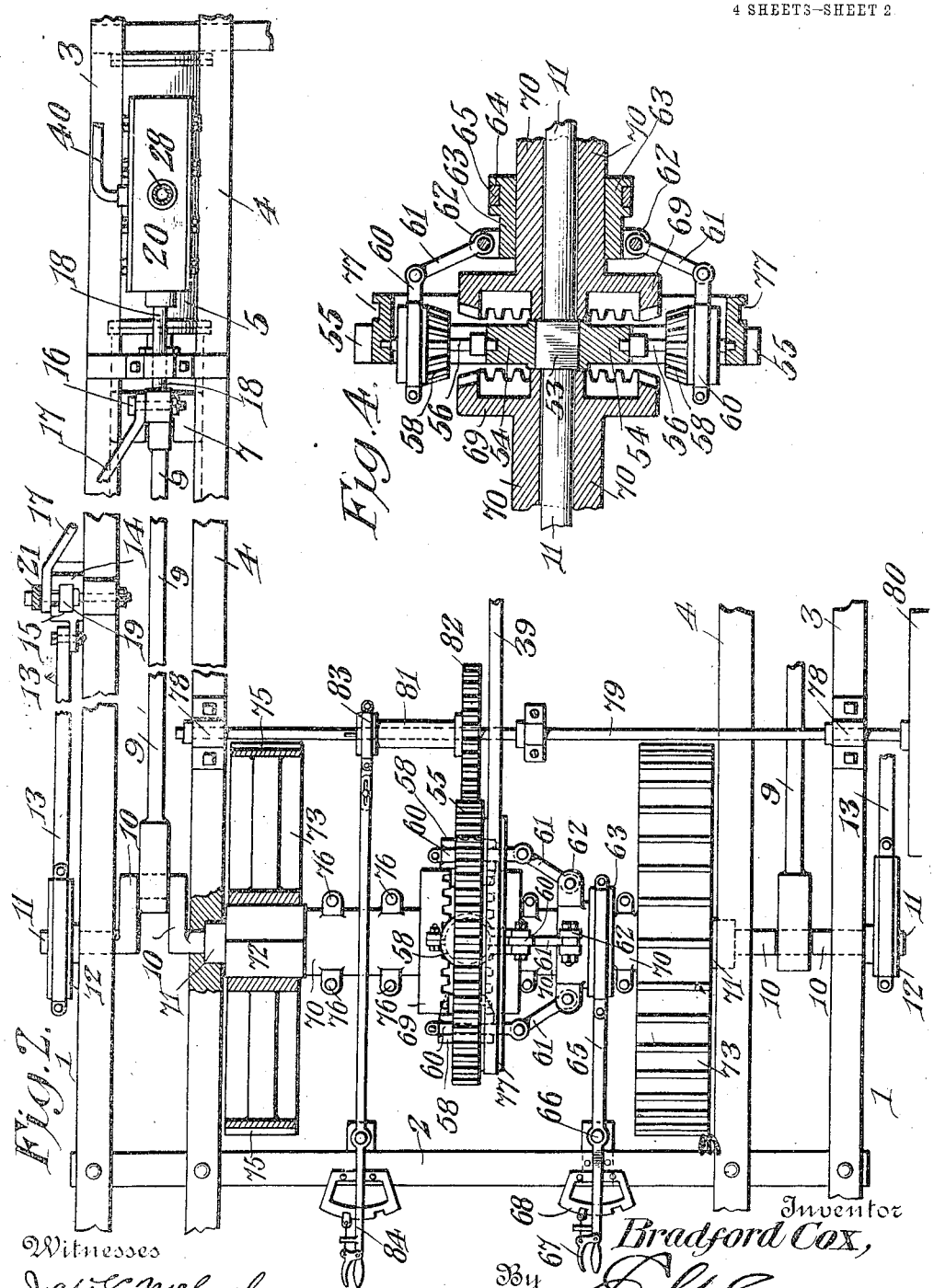

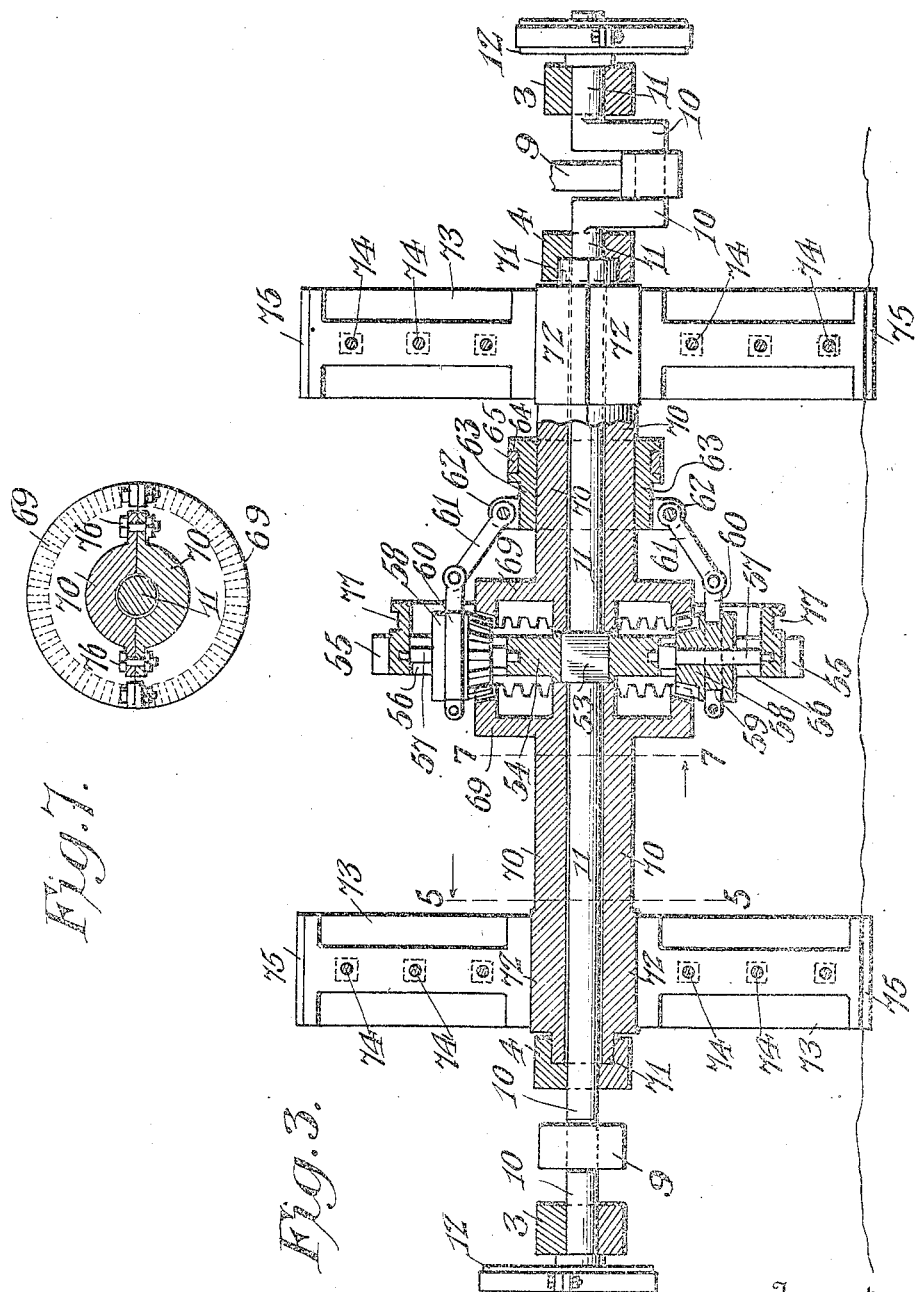

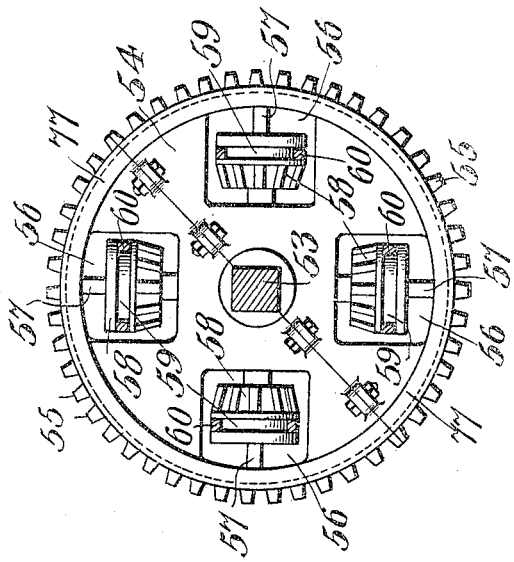
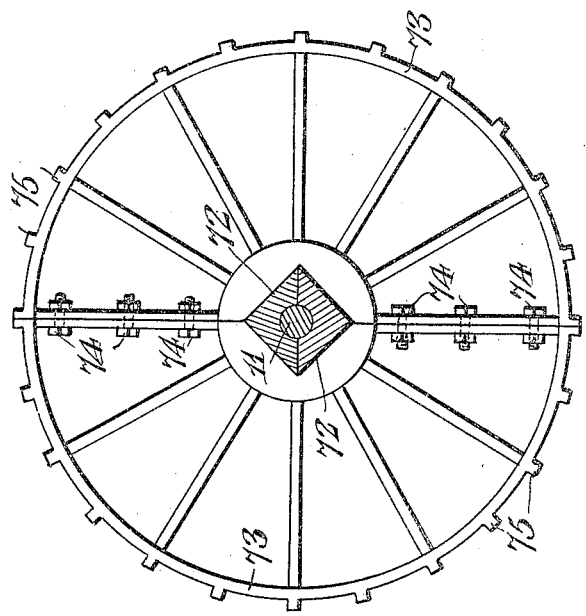

BRADFORD COX, OF PLAINVIEW, TEXAS.

TRACTION-ENGINE.

1,042,405.

Specification of Letters Patent. Patented Oct. 29, 1912.

Application filed May 27, 1910. Serial No. 563,800.

*To all whom it may concern:*

Be it known that I, BRADFORD COX, a citizen of the United States, residing at Plainview, in the county of Hale and State of Texas, have invented a new and useful Traction-Engine, of which the following is a specification.

My invention relates to traction engines and has for its object the provision of means whereby the working cylinder may be connected directly with the axle of the traction wheels and the gearing, by which the traction wheels are rotated and the power is applied to driven machinery, may be arranged in a compact manner.

The invention also has for its object the provision of a simple and compact mechanism whereby the power of the working cylinders may be utilized to propel the engine to actuate driven machinery.

A further object of the invention is to provide a novel form of compensating gear by which movement of the traction wheels at different rates of speed, when turning corners, will be readily permitted without any bending strain on the driving axle and which will also be utilized to transmit the power of the working cylinders to driven machinery and be capable of adjustment, when actuating such machinery, to prevent the application of power to the traction wheels so that the engine will remain stationary.

These stated objects, and such other incidental objects as will hereinafter appear, are attained in the mechanism illustrated in the accompanying drawings, and the invention consists in certain peculiar features of the same which will be hereinafter first fully described and then particularly pointed out in the appended claims.

In the drawings,—Figure 1 is a side elevation of a traction engine embodying my improvements, the boiler being partly broken away. Fig. 2 is an enlarged plan view, partly in section, of the driving axle or shaft and the parts immediately contiguous thereto. Fig. 3 is a vertical section taken transversely of the machine and longitudinally through the traction axle or driving shaft. Fig. 4 is a detail sectional view through the master gear showing the compensating pinions arranged in a different position from that shown in Fig. 3. Fig. 5 is a detail sectional elevation, the section being taken on the line 5—5 of Fig. 3. Fig. 6 is a detail elevation of the master gear and the slidable pinions mounted therein. Fig. 7 is a detail sectional view on the line 7—7 of Fig. 3.

In carrying out my invention, I employ a frame 1 consisting of longitudinal and transverse beams, the longitudinal beams being arranged in pairs at the sides of the engine, and the transverse beams being arranged at suitable points along the longitudinal beams to give sufficient rigidity to the structure. In Fig. 2 the transverse beams are indicated by the reference numeral 2, and the longitudinal beams by the numerals 3 and 4, the beams 3 being arranged at the outer ends of the transverse beams, and the beams 4 being disposed parallel with the beams 3, adjacent to the same, so as to provide a proper support for the working cylinders, and also protect the pistons, cross heads, and connecting rods. The working cylinders 5 are secured to the beams 3 and 4 near the front ends thereof and depend therefrom, as shown clearly in Fig. 1, and the pistons working in the said cylinders are connected by piston rods 6 with cross heads 7, sliding in guides or ways formed by the beams 3 and 4 and suitable beams 8 secured to and depending from the under sides of the said beams. Connecting rods 9 are pivoted to the cross heads 7 and extend therefrom to cranks 10 formed near the ends of the axle or driving shaft 11 which is mounted in suitable bearings on the under sides of the beams 3 and 4, as shown, and as will be readily understood. These cranks 10 are disposed to work in the space between the longitudinal beams 3 and 4 and on the ends of the axle, beyond the outer beams 3, I secure eccentrics 12 which are connected by eccentric rods 13 to a vibratory plate or link 14 which is pivoted at its center to the outer beam, as shown in Fig. 1. The eccentric rod 13 is pivoted to the rear edge of this link or plate 14, above the center of the same, and the said plate or link is grooved on its outer side, as shown at 15, and is curved on an arc having as its center the pivot 16 by which the pitman 17 is connected to the end of a valve stem 18. The rear end of the pitman 17 is pivoted to a slide 19 working in the groove 15, and the valve stem 18 projects from a slide valve within the steam chest 20 by which the steam is admitted to the cylinder 5, as will be readily understood.

In order to control the direction of travel of the engine, a link 21 is pivoted to the slide 19, and the upper end of this link is pivoted to a crank arm 22 projecting forward from a rock shaft 23 mounted in suitable bearings on the under side of the boiler 24, as shown. A crank arm 25 projects upward from the rock shaft 23 and is connected by a link 26 with a controlling lever 27 disposed at the rear end of the boiler within convenient reach of the engineer. It will be understood that the crank arm 22 is duplicated at the opposite end of the rock shaft so that the slide 19 at both sides of the engine will be moved up or down by the manipulation of the controlling lever 27 and the slide valves in the steam chest 20 thereby caused to move simultaneously in the same direction. Steam is admitted to the steam chest 20 by a feed pipe 28 which leads from the boiler, as shown, and within the smoke-box at the front end of the boiler, I provide an annular partition 29 whereby a super-heating space 30 is formed from which the said pipe 28 leads. The steam from the boiler will be collected in the usual steam dome 31 and the throttle valve, indicated in dotted lines at 32, is located in the dome and has a pipe 33 leading forward through the boiler to the super-heater 30. The throttle valve is controlled by a throttle rod 34 extending rearwardly and connected to a controlling lever 35 arranged within convenient reach of the engineer. The feed pipe 28 passes to a valve chamber 36 before entering the steam chest, and mounted on the said valve chamber, and controlling the valve therein, is a speed governor 37 which is actuated by a pulley 38 and a belt 39 extending around the said pulley and driven by the master gear, as will be presently set forth. After passing the valve chamber 36, the feed pipe is branched so as to extend to the valve chests, as will be readily understood. From each of the valve chests an exhaust pipe 40 leads up to the front end of the boiler so as to discharge into the smoke box 41 and create a forced draft through the smoke stack 42 so as to maintain the combustion in the fire chamber in the proper state of efficiency.

The boiler is supported upon suitable brackets or standards 43, 44 and 45 secured to and rising from the main frame 1, as will be readily understood.

The steering wheels 46 are mounted at the front end of the main frame upon an axle 47 which is mounted to rotate on a suitable king bolt and is connected with a steering shaft 48 having a worm pinion 49 on one end meshing with a worm 50 on the front end of a steering rod 51 which extends rearwardly to the engineer's platform where it is equipped with a hand wheel 52, as will be readily understood.

The driving shaft or axle 11 is provided at its center with an angular portion 53 and upon this angular portion I secure a master gear 54 having gear teeth 55 around its periphery and provided between its periphery and its center or hub with openings or cutaway portions 56 through which extend axles or pins 57 which are disposed radially of the master gear. Upon these axles or radial pins, I mount beveled pinions 58 provided near their outer ends with annular grooves 59 adapted to be engaged by yokes 60, which yokes are pivotally attached to the outer ends of links or levers 61, which extend to and are pivotally connected with lugs 62 projecting radially from a collar 63, as shown. The collar 63 is provided with an annular groove 64 which receives the forked front end of an operating lever 65 fulcrumed upon the main frame, as shown at 66, and equipped at its rear end with a latch 67 adapted to engage a rack 68 on the main frame in the usual manner. It will be readily seen that by swinging the lever 65 to one or the other side upon its fulcrum 66, the collar 63 will be moved toward or away from the master gear, and the links 61 will, consequently, be actuated so as to slide the beveled pinions 58 in or out radially upon the pins 57. The beveled pinions 58 are arranged between beveled gears 69 formed on the inner ends of sleeves 70 mounted loosely on the axle 11 and extending outwardly so as to find bearings in the inner, longitudinal beams 4 of the main frame, as shown at 71. Near their outer extremities, these sleeves 70 are provided with angular portions 72 around which are engaged the halves of traction wheels 73, the said halves being firmly secured together by bolts 74, as shown in Fig. 5. The traction wheels are provided with the usual ground-engaging ribs or cleats 75 on their treads, and their hubs are given an angular formation so as to engage the angular portions 72 of the sleeves 70 whereby the wheels will be positively rotated whenever motion is imparted to the sleeves. The sleeves, with the gear wheels 69, formed on the inner ends of the same, are formed in two sections or members secured together around the driving shaft or traction axle by bolts 76, and a similar construction is employed for the master gear so that the said sleeves and the gears on the ends of the same may be readily assembled around the axle, and the construction of the traction wheels likewise facilitates their mounting upon the angular ends of the said sleeves. The collar 63 is mounted loosely upon one of the sleeves 70 and both sleeves are mounted loosely upon the driving shaft or traction axle. It will thus be readily seen that the axle is free to rotate within the sleeves without imparting movement thereto and that the rotation of the sleeves will not necessarily rotate the collar.

When the parts are arranged as shown in Fig. 3, the motion of the driving shaft or axle will, of course, be imparted directly to the master gear, as the beveled pinions 58 will be carried around the axle by the said gear. Inasmuch as the beveled gears are now in mesh with the gear wheels 69, the said gear wheels will be caused to move around the axle as a center and the traction wheels 73 will be rotated so that the traction engine will be caused to travel. If the lever 65 be vibrated so as to move the collar 63 toward the gears 69, the beveled pinions 58 will be moved outward away from the said gears 69, as shown in Fig. 4, and the said gears will, consequently, not be actuated and the travel of the engine will be arrested. Should the engine, during its travel, be guided out of a straight line, the traction wheels will be permitted automatically to acquire different rates of speed, owing to the different curves described by them, inasmuch as the pinions 58 are free to rotate about their respective axles 57, and, consequently, the gears 69 will not be locked to the pinions so that they will be forced to travel at the same rate of speed, but will actuate the said pinions so as to rotate them around their respective axles and consequently permit the gears to travel at different speeds. The governor 37 is actuated directly from the master wheel by having the belt 39 pass around a grooved pulley 77 formed on the side of the master wheel, as shown.

Mounted in suitable bearings 78 on the upper side of the longitudinal beams of the main frame is a counter-shaft 79 having a band pulley or fly wheel 80 at one end which may be engaged by a belt to transmit the power of the machine to a distant point where it may be utilized in any desired manner. At a point adjacent the center of the counter-shaft I slidably mount thereon a sleeve 81 having a pinion 82 at one end adapted to mesh with the gear teeth 55 of the master wheel, and provided at its opposite end with a grooved collar engaged by a yoke or fork 83 which is manipulated by means of a controlling lever 84 so as to be moved longitudinally upon the counter-shaft and thereby draw the pinion 82 out of or into mesh with the master gear wheel, as will be readily understood.

When it is desired to utilize the power of the engine to operate machinery, all that is to be done is to shift the lever 65 so as to move the beveled pinions 58 outward to the position shown in Fig. 4 when the travel of the traction engine will cease. The engines may then be slowed down or stopped, as may be deemed necessary by the engineer, and the belt fitted around the band pulley 80 and also around the driven working shaft, after which the lever 84 is manipulated to throw the pinion 82 into mesh with the master gear wheel. The power generated in the working cylinders 5 will then be transmitted through the crank shaft and the master gear wheel to the pinion and the counter-shaft, whence it will be utilized through the fly wheel or pulley 80 and the belt passing around the same, as will be readily understood.

It will be readily noted that I apply the power of the engines directly to the axle without the intervention of counter-shafts or complicated systems of gearing, and that the power of the engines may be utilized to drive threshing machines or perform other work directly and positively. The turning of the engine out of a straight line while it is traveling will not place a bending or breaking strain upon the axle, inasmuch as the traction wheels are independently mounted upon the axle or driving shaft and are not secured directly to the said axle. The dead weight which the engine must carry is, consequently, reduced to a minimum without in any way affecting the efficiency of the apparatus. Inasmuch as the power is applied directly to the driving shaft or axle, the machine can be operated more economically than has heretofore been possible, inasmuch as no portion of the power is utilized in driving a long train of gearing which will necessarily create a high frictional resistance.

The advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described my invention, what I claim is:—

1. In a traction engine, a drive axle, a power means in constant connection with said axle, drive wheels loosely mounted on the axle, coupling means between the axle and the drive wheels and provided with means for connecting the drive wheels with the axle and disconnecting them therefrom at will, and power transmitting means for other work than the propelling of the vehicle, also connected to and receiving power from the axle.

2. In a traction engine, a drive axle, a power means in constant connection with said axle, drive wheels loosely mounted on the axle, coupling means between the axle and the drive wheels and provided with means for connecting the drive wheels with the axle and disconnecting them therefrom at will, and power transmitting means for other work than the propelling of the vehicle, also connected to and receiving power from the axle, the said last named power transmitting means including means for coupling it to and uncoupling it from the axle at will.

3. In a traction engine, a drive axle, a power means for the axle in constant operative connection therewith, traction wheels loosely mounted on the axle, differential gearing between the axle and the traction wheels, one member of the differential gearing being carried by the axle, power transmitting means for other work than propelling the vehicle also carried by the member of the differential gear carried by the axle, and means for moving the member of the differential gear carried by the axle into and out of operative relation to the members of the differential gear carried by the traction wheels.

4. In a traction engine, a drive axle, a power means directly and constantly connected with the drive axle, traction wheels mounted loosely on the axle, a master gear wheel fixed to the axle between the traction wheels for the transmission of power to other structures than the traction wheels, gear wheels fixed to the traction wheels, pinions carried by the master gear wheel and movable into and out of mesh with the said gear wheels, and means for adjusting said pinions.

5. In a traction engine, a supporting frame, a crank axle mounted upon said frame transversely thereto, working cylinders mounted on the frame and having pistons connected directly with the cranks of the axle, traction wheels mounted loosely on the axle and each provided with a gear wheel fast thereto, a master gear wheel fixed to the axle between the gear wheels carried by the traction wheels and provided with connections for the transmission of power to other structures than the traction wheels, pinions carried by the master gear wheel and movable into and out of mesh with the gear wheels fixed to the traction wheels, and means for adjusting the pinions.

6. In a traction engine, a drive axle, power means for driving the axle, a master gear wheel fixed on said axle at substantially the center thereof and provided with means for the transmission of power therefrom, pinions carried by said master gear and movable radially thereof, sleeves mounted loosely on the axle on opposite sides of the master gear, gear wheels at the ends of the sleeves adjacent the master gear and adapted to mesh with the pinions on the master gear, traction wheels fixed on the ends of the sleeves remote from the gear wheels thereon, a collar mounted loosely on one of said sleeves, connections between said collar and the pinions on the master gear, and means for shifting the collar longitudinally of the sleeve to move the pinions radially of the master gear into and out of mesh with the gear wheels on the sleeves carrying the traction wheels.

7. In a traction engine, a drive axle, power means constantly connected with the drive axle, traction wheels loosely mounted on the drive axle, power transmitting means between the axle and the traction wheels and including means for coupling the traction wheels to and uncoupling them from the drive axle at will, a gear wheel fixed to the drive axle, a counter-shaft adjacent the drive axle and provided with a gear wheel meshing with the gear wheel on the drive axle, and means operable at will for coupling the last-named gear wheel to and uncoupling it from the counter-shaft at will.

8. In a traction engine, a drive axle, power means connected to the drive axle and provided with a governor, traction wheels mounted loosely on the drive axle, a master gear fast to the drive axle, differential gearing between the master gear and the traction wheels, said differential gearing including pinions carried by the master gear and movable radially with respect thereto into and out of mesh with the members of the transmission gear connected with the traction wheels, and said master gear being also provided with a pulley, power transmitting means in position to be driven by the master gear, and connections between the pulley and governor.

9. In a traction engine, a power means, a governor therefor, a drive axle to which the power means is constantly connected, traction wheels mounted loosely on the axle, connections between the axle and the traction wheels including means for coupling the traction wheels to and uncoupling them from the axle, means for the transmission of power from the axle to other structures than the traction wheels, and connections between the axle and the governor.

10. In a traction engine, an axle, power means in driving relation to the axle, traction wheels mounted loosely on the axle, a master gear fast on the axle, a differential gear having members fast to the traction wheel and other members carried by the master gear, means for connecting the differential gear to and disconnecting it from the traction wheels, power transmitting means in position to be driven by the master gear, a governor for the driving means, a pulley carried by the master gear, and belt connections between the pulley and the governor.

11. In a traction engine, an axle, power means connected to said axle for rotating the same, a master gear wheel for the transmission of power fixed on said axle and having radially disposed pins, pinions slidably mounted on said pins, traction wheels loosely mounted on the axle on opposite sides of the master wheel, gear wheels fixed to the respective traction wheels and adapted to mesh with the pinions, and means for moving the pinions upon the radial pins into and out of meshing relation with the gear wheels on the traction wheels.

12. In a traction engine, a drive axle, means for rotating the same, traction wheels loosely mounted on the axle, a master gear fixed on the axle between the traction wheels, connections between the axle and the traction wheels and including means for coupling the traction wheels to and uncoupling them from the axle, a counter-shaft, and a pinion on said counter-shaft adapted to mesh with the master gear.

13. In a traction engine, a drive axle, means for rotating the same, traction wheels loosely mounted on the axle, a master gear fixed on the axle between the traction wheels, connections between the axle and the traction wheels and including means for coupling the traction wheels to and uncoupling them from the axle, a counter-shaft, a pinion on said counter-shaft adapted to mesh with the master gear, and means for moving said pinion at will into and out of engagement with the master gear.

14. In a traction engine, a drive axle, traction wheels mounted loosely thereon, a master gear wheel fixed on the axle between the traction wheels, differential gearing between the master gear wheel and the traction wheels, and including means for connecting the master wheel to and disconnecting it from the traction wheels, a counter-shaft, a pinion thereon adapted to mesh with the master gear, means for moving said pinion into and out of engagement with the master gear at will, and engines directly connected to the drive shaft.

15. In a traction engine, a supporting frame, a crank axle mounted transversely thereupon, engines directly connected to the cranks of the crank axle, traction wheels loosely mounted on the axle, compensating gearing between the traction wheels and the axle, and means carried by the axle for the transmission of power therefrom to other structures than the traction wheels.

In testimony, that I claim the foregoing as my own, I have hereto affixed my signature in the presence of two witnesses.

BRADFORD COX.

Witnesses:
   JAS. R. HAMILTON,
   G. A. LONDAU.